United States Patent
Adachi

(10) Patent No.: US 6,451,468 B1
(45) Date of Patent: Sep. 17, 2002

(54) SEALING MATERIAL FOR FUEL CELL

(75) Inventor: Mamoru Adachi, Tokyo (JP)

(73) Assignee: Three Bond Co., Ltd., Tokyo (JP)

( * ) Notice: Subject to any disclaimer, the term of this patent is extended or adjusted under 35 U.S.C. 154(b) by 0 days.

(21) Appl. No.: 09/673,306

(22) PCT Filed: Apr. 1, 1999

(86) PCT No.: PCT/JP99/01730

§ 371 (c)(1),
(2), (4) Date: Dec. 7, 2000

(87) PCT Pub. No.: WO99/53559

PCT Pub. Date: Oct. 21, 1999

(30) Foreign Application Priority Data

Apr. 14, 1998 (JP) ............................................. 10-101633

(51) Int. Cl.[7] .............................. H01M 2/08; B05D 5/12
(52) U.S. Cl. ................................ 429/35; 429/36; 429/34
(58) Field of Search .............................. 429/35, 34, 36, 429/30, 12; 427/115

(56) References Cited

U.S. PATENT DOCUMENTS 5,219,674 A * 6/1993 Singelyn et al. ............ 29/623.2

FOREIGN PATENT DOCUMENTS

| JP | 3-17962 | * | 1/1991 | ............ H01M/8/02 |
| JP | 3-71562 | * | 3/1991 | ............ H01M/8/02 |
| JP | 6-279691 | | 10/1994 | ......... C08L/101/02 |
| JP | 7-502374 | | 3/1995 | ............ H01M/8/02 |
| JP | 7-220741 | | 8/1995 | ............ H01M/8/02 |
| JP | 7-220941 | | 8/1995 | |
| JP | 8-269317 | | 10/1996 | ............ C08L/71/02 |
| JP | 11-219714 | | 8/1999 | ............ H01M/8/02 |

OTHER PUBLICATIONS

English language abstract 07–220741 Aug. 18, 1995.

English language abstract 11–219714 Aug. 10, 1999.

* cited by examiner

Primary Examiner—Patrick Ryan
Assistant Examiner—R Alejandro
(74) Attorney, Agent, or Firm—Sughrue Mion, PLLC

(57) ABSTRACT

A liquid resin composition (26) comprising A) an addition-polymerizable oligomer which has, as the backbone thereof, a linear polyisobutylene or perfluoropolyether structure and has an alkenyl group at least at each end, B) a hardener containing, in its molecule thereof, at least two hydrogen atoms each bonded to a silicon atom, and C) a hydrosilylation catalyst is three-dimensionally crosslinked to form a sealing layer in a unit cell (20) of a fuel cell assembly to thereby seal separators (24) and (25), a pair of electrodes (22) and (23), and an ion-exchange resin (21) as a solid electrolyte. Thus, each cell can be reduced in thickness and size to enable the fuel cell assembly to have a high output.

8 Claims, 1 Drawing Sheet

SEALING MATERIAL FOR FUEL CELL

TECHNICAL FIELD

The present invention relates to a sealing material for each cell of a fuel cell assembly, which comprises a liquid resin composition capable of forming a low-gas-permeable and elastic sealing layer at a bonded surface among separators, a pair of electrodes and an ion exchange resin serving as a solid electrolyte by three-dimensional crosslinking, thereby airtightly sealing them completely.

BACKGROUND ART

A fuel cell is an apparatus for directly converting an energy of a fuel into an electric energy. For example, an electromotive force can be obtained by the electrochemical reaction at both electrodes with supplying a hydrogen-containing fuel gas and an oxygen-containing oxidizing gas to an anode and a cathode, respectively. This electrochemical reaction can be expressed by the reaction of Equation (1) at the anode, the reaction of Equation (2) at the cathode and the reaction of Equation (3) in the whole cell.

$$H_2 \rightarrow 2H^+ + 2e^- \tag{1}$$

$$(\tfrac{1}{2})O_2 + 2H + 2e^- \rightarrow H_2O \tag{2}$$

$$H_2 + (\tfrac{1}{2})O_2 \rightarrow H_2O \tag{3}$$

A fuel cell generally comprises a pair of electrodes and a solid electrolyte membrane disposed therebetween. A hydrogen-containing fuel gas is supplied to the anode electrode, while an oxygen-containing oxidizing gas is supplied to the cathode electrode separately and isolatedly from the hydrogen-containing fuel gas. If they are not separated sufficiently and happen to mix each other, an electricity generating efficiency lowers inevitably.

A fuel cell is generally a fuel cell assembly having unit cells, each having a pair of electrodes as a principal unit, stacked one after another. Each unit cell has a pair of electrodes and a solid electrolyte membrane sandwiched therebetween and, moreover, has this sandwiched structure disposed between gas impermeable separators.

These separators serve to prevent mixing of gases between two adjacent cells. The solid electrolyte membrane acts a role of separating a fuel gas and a:n oxidizing gas to be fed into each of the unit cells.

As a conventional airtight sealing method, a technique of disposing a groove at the end of the separator and disposing an O-ring at this groove, thereby preventing these gases, which are to be supplied to opposite sides of a solid electrolyte membrane, from being mixed is disclosed in JP-A-6-119930 (the term "JP-A" as used herein means an "Unexamined published Japanese patent application) and JP-A-6-68884.

As a solid electrolyte, an ion exchange resin membrane is used for a small-sized fuel cell. Since the ion exchange resin membrane exhibits electrically conductive behavior when it is wet, the ion exchange resin membrane is kept wet by supplying moisture to each cell of the fuel cell during operation. In other words, the ion exchange resin membrane must have two functions, that is, a function for separating a fuel gas from an oxidizing gas and a function for maintaining a wet state. An ion exchange resin membrane made of a fluorine resin can be mentioned as a preferable ion exchange resin membrane equipped with these functions.

An airtight sealing technique with an adhesive instead of the above-described O-ring is disclosed in JP-A-7-249417, while a thermocompression bonding technique of an ion exchange resin membrane is disclosed in JP-A-6-119928. However, the ion exchange resin membrane made of a fluorine resin generally has poor adhesion, so that assured airtight sealing cannot be attained by the above-described techniques.

As for the case where an epoxy resin adhesive is used for bonding, a technique of improving the adhesion of an ion exchange resin membrane by subjecting its bonded surface to ion exchange pretreatment is disclosed in JP-A-9-199145. This pretreatment improves adhesion, but lowers electric conductivity, leading to a reduction in electromotive force of a fuel cell.

With regard to a sealing material composition which undergoes addition polymerization through hydrosilylation, a perfluoropolyether-based composition and a polyisobutylene-based composition are disclosed in JP-A-8-269317 and JP-A-6-279691, respectively.

DISCLOSURE OF THE INVENTION

If each constituting element of a fuel cell has a reduced film thickness and each unit cell becomes thin, the number of unit cells to be stacked in a predetermined space can be enlarged, resulting in an increased output of the fuel cell. However, airtight sealing of a separator and an ion exchange resin membrane with an O-ring requires an extra thickness for disposing a groove for the O-ring, which disturbs the thinning and increased output of the fuel cell. Moreover, since airtight sealing effects are not exhibited unless the ion exchange resin membrane is compressed by a clamping force by the O-ring, the size of the membrane must necessarily be made larger than the groove for the O-ring.

It is impossible to clamp the vicinity of the electrode by the O-ring, because the electrodes, which are made of a porous material to permit diffusion of gases in the electrodes and hence are remarkably fragile, are broken if strongly clamped by the O-ring.

Consequently, the airtight sealing method by the O-ring requires an increase in the area of the ion exchange resin membrane, thereby disturbing the size reduction of a fuel cell. In addition, this method requires a high cost for the production of a fuel cell assembly owing to costly cutting work of the O-ring groove on the separator in addition to a markedly expensive ion exchange resin membrane.

Concerning the airtight sealing with an epoxy resin adhesive, it requires ion exchange pretreatment-of the bonded surface of the ion exchange resin membrane for improving adhesion. In addition, this method is accompanied with a problem of an elution of impurity ions such as chlorine ion from the epoxy resin. If the membrane is contaminated with impurity ions eluted from the epoxy resin, the electric conductivity of the membrane lowers, leading to deterioration in the electromotive force of each unit cell. As a result, the total electromotive force of the fuel cell assembly having unit cells stacked in series is reduced.

The thermocompression bonding of an ion exchange resin membrane also requires ion exchange pretreatment of the membrane and therefore is not free from the above-described problems. The thermocompression bonding tends to damage the ion exchange resin membrane and the thus damaged membrane presumably may be short-circuited owing to a difference in the internal pressure upon operation of a fuel cell.

The air tightness of a fuel cell sealed by an O-ring or epoxy resin adhesive is incomplete because of the above-described reasons, so that when it is used with being mounted on an automobile, etc., gas leakage tends to occur owing to the vibration upon traveling.

The sealing material according to the present invention realizes a minimization in the area of the ion exchange resin membrane of each unit cell and also a reduction in its film thickness, which makes it possible to decrease the size of a fuel cell and prevent reduction in the electromotive power. In addition, use of the sealing material of the present invention permits formation of an elastic sealing layer on the bonded surfaces among the ion exchange resin membrane, separators and a pair of electrodes, whereby highly reliable air tightness can be attained and the wet state of the membrane can be kept completely.

When the sealing material of the present invention is employed upon production of a fuel cell using an ion exchange resin membrane, ion exchange pretreatment for improving the adhesion to the membrane or the use of another sealing member such as O-ring becomes unnecessary, and in addition, the membrane is free from the problem of contamination with impurity ions eluted from an epoxy resin adhesive.

In the present invention, therefore, an ion exchange resin membrane can be completely adhered and sealed airtightly with separators or a pair of electrodes as compared to the conventional technique; a size reduction and thickness decrease of a fuel cell assembly can be attained as compared to the system using an O-ring; and the working step can be shortened and cost can be reduced as compared to the system using an epoxy resin adhesive, because the adhesion improving pretreatment is not necessary.

The sealing material according to the present invention has features, for example, a) a markedly low-gas-permeability, b) excellent tightness/adhesion with an ion exchange resin membrane, c) less elution of impurity ions after hardening, and d) a low moisture permeability. Therefore, it is possible to airtightly seal the ion exchange resin membrane completely with separators or a pair of electrodes without causing a deterioration in the performances of the membrane.

In the present invention, it is preferred that each of the separators or a pair of electrodes to be bonded with an ion exchange resin membrane has a roughened surface, because this increases the adhesion area of the sealing material in unevenness of the roughened surface, which enables stronger adhesion.

The sealing material according to the present invention is a low-gas-permeable and reactive liquid resin composition. The sealing material is three-dimensionally crosslinked after applied to bonded surfaces among the members of each unit cell, i.e., separators, a pair of electrodes and an ion exchange resin membrane serving as a solid electrolyte, thereby airtightly sealing them. The sealing material comprises an addition-polymerizable oligomer which has, as the backbone in the molecule, either a linear polyisobutylene or perfluoropolyether structure and has an alkenyl group at least at each end, B) a hardener containing, in its molecule thereof, at least two hydrogen atoms each bonded to a silicon atom, and C) a hydrosilylation catalyst.

One of the two kinds of the addition polymerizable oligomers as the component A) has, as the backbone in its molecule, a linear polyisobutylene structure and has, at least at each end, a reactive group. This addition polymerizable oligomer preferably has a molecular weight of 500 to 100000 and a total amount of isobutylene-derived recurring units of not lower than 50 wt. %. The addition polymerizable oligomer may be formed entirely of isobutylene units, or may be a copolymer with 50 wt. % or less, per molecule, of a polyolefin such as polyethylene and polypropylene or a polydiene such as polybutadiene and polyisoprene.

The other one kind of the addition polymerizable oligomers as the component A) has, as the backbone in its molecule, a linear perfluoropolyether structure and has, at least at each end, a reactive group. This addition polymerizable oligomer has 3 to 400 recurring units shown below.

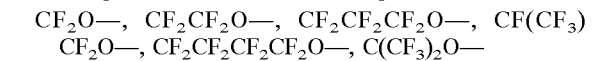

Such an addition polymerizable oligomer having a perfluoropolyether structure has a viscosity ranging from 25 to 1,000,000 mm$^2$/s.

Although there is no particular limitation imposed on the hardener as the component B), insofar as it contains, in its molecule thereof, at least 2 hydrogen atoms each bonded to a silicon atom, a hardener which has, by itself, low gas permeability and is compatible with the addition polymerizable oligomer is preferred. In other words, when the backbone of the addition polymerizable oligomer has a polyisobutylene structure, the hardener is preferred to have a backbone of a polyisobutylene structure, while when the backbone of the addition polymerizable oligomer has a perfluoropolyether structure, the hardener is preferred to have a backbone of a perfluoropolyether structure. Such a combination is most preferred.

It is preferred that the amount of the hydrosilyl group in the hardener falls within a range of 0.5 to 5 moles per 1 mole of the alkenyl group of the addition polymerizable oligomer. The hardener preferably has a molecular weight ranging from 100 to 30000.

As the component C), ordinarily employed hydrosilylation catalysts such as chloride of platinum, titanium, palladium or rhodium may be used. Specific examples of the preferred catalyst include platinum chloride, platinum-vinyl siloxane complex, platinum-phosphine complex, platinum-phosphite complex, platinum-alcoholate complex and platinum-olefin complex.

To the sealing material of the present invention, a known material such as filler, extender pigment, antioxidant or surfactant may be added as needed within an extent not causing a problem of elution of impurity ions.

The sealing material of the present invention is used by applying it in the liquid form to the bonding surfaces of each of separators, a pair of electrodes and an ion exchange resin serving as a solid electrolyte, assembling them into a unit cell, and three-dimensionally crosslinking the sealing material under heating or by allowing it to stand at the normal temperature, to thereby form an elastic sealing layer from the sealing material on the bonded surfaces. A plurality of the unit cells thus fabricated are stacked one after another by applying a compressive force that is larger than the clamping force for fixing in the above-described crosslinking step. Stacking while under compression makes it possible to enhance the air tightness of the stacked structure, because the sealing material crosslinked by addition polymerization undergoes cure shrinkage to some extent.

Figure 1:
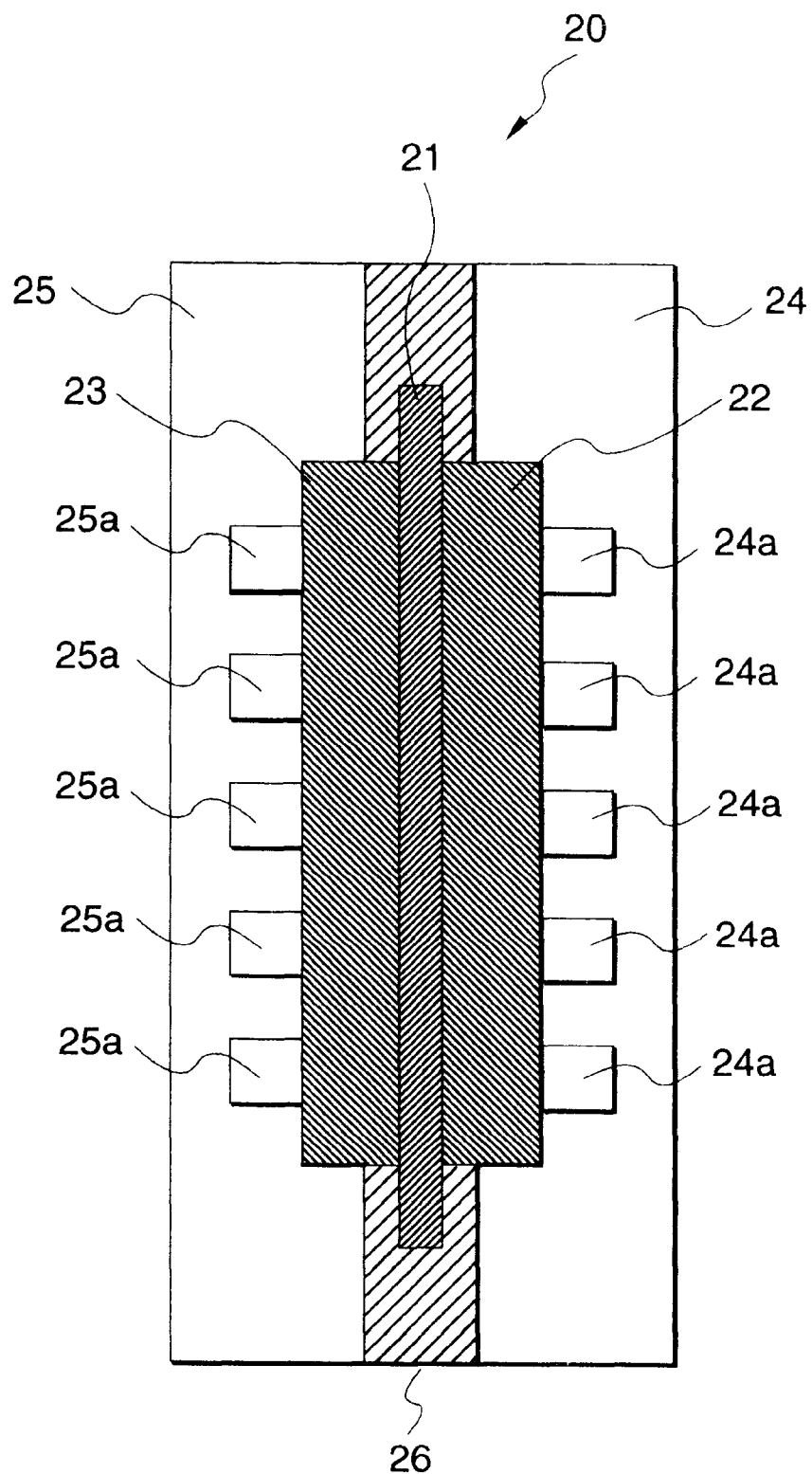
FIG. 1 is a cross-sectional view illustrating a unit cell of a fuel cell assembly.

In this drawing, numeral (21) denotes an ion exchange resin membrane; (22), an anode electrode; (23), a cathode electrode; (24) and (25), separators; (24a), a channel for a fuel gas; (25a), a channel for an oxidizing gas; and (26), the sealing material of the present invention.

An embodiment of the present invention is described based on examples. A fuel cell has a structure having a plurality of unit cells stacked one after another. FIG. 1 is a schematic cross-sectional view of a unit cell (20). The unit cell (20) which is a fundamental unit of the fuel cell assembly is composed of the ion exchange resin membrane (21), anode (22), cathode (23) and separators (24) and (25).

The ion exchange resin membrane (21) is sandwiched between the anode (22) and cathode (23), which is sandwiched further by separators (24) and (25). On the surfaces of the anode (22) and cathode (23), channels for a fuel gas and for an oxidizing gas are formed, respectively. The channels (24a) for a fuel gas are formed between the anode (22) and separator (24), while the channels (25a) for an oxidizing gas are formed between the cathode (23) and separator (25).

The separators (24) and (25) form gas channels between electrodes and also serve to separate the fuel gas and the oxidizing gas between two adjacent cells.

The ion exchange resin membrane (21) is a solid electrolyte and is an ion exchange membrane formed from a fluorine-containing resin and being ion conductive. It exhibits electrically conductive behavior under a wet state. In the experiment of the present invention, "Nafion" (product of E.I. Du Pont de Nemours and Company) was employed as the ion exchange resin membrane.

Each of the anode (22) and cathode (23) is formed of a carbon cloth woven from carbon fibers and is subjected to contact bonding with the ion exchange resin membrane (21) under heat at 120 to 130° C.

BEST MODE FOR CARRYING OUT THE INVENTION

Bonding of a pair of electrodes, i.e., the anode (22) and cathode (23), separators (24) and (25) and ion exchange resin membrane (21) with the sealing material of the present invention is described below.

The sealing material (26) employed in Example 1 is a heat-curing sealing agent ("Three Bond 11X-058", product of Three Bond Co., Ltd.) in which each of the backbones of the addition polymerizable oligomer and curing agent, is perfluoropolyether. The sealing agent (26) is applied to each of the surfaces, to be bonded, of the separator (24) equipped with the anode (22) and the separator (25) equipped with the cathode (23), and these separators (24) and (25) are engaged at a predetermined position to assemble a unit cell (20), whereby a sealing layer in the uncrosslinked liquid form is formed to cover the ion exchange resin membrane (21).

The ion curing resin membrane (21) undergoes, depending on the material, a change in the membrane quality when thermally treated at 150° C. or greater, resulting in enhanced hydrophobic nature and hence in reduced electrical conductivity. By heating the unit cell (21) at a temperature not greater than 100° C., an elastic sealing layer could be formed through three-dimensional crosslinkage of the uncrosslinked sealing layer without thermally damaging the ion exchange resin membrane (21).

The sealing material (26) employed herein is a liquid resin composition having features that it comprises A) an addition-polymerizable oligomer which has, in its molecule thereof, at least two alkenyl groups, has a perfluoropolyether structure in its backbone and has a viscosity at 25° C. of 10,000 to 1,000,000 $mm^2$/s; B) a hardener which contains, in its molecule thereof, at least two hydrogen atoms each bonded to a silicon atom, has a perfluoropolyether structure in its backbone, and a viscosity at 25° C. of 10,000 to 500,000 $mm^2$/s; and C) a catalytic amount of a platinum compound, and that the hardener B) is incorporated so that the amount of the hydrosilyl group ranges from 0.5 to 5 moles per mole of the alkenyl group in the addition polymerizable oligomer.

The sealing material employed in this Example has the following properties:

1) In a temperature range of from 80 to 150° C., the sealing material is crosslinked for from 30 to 60 minutes and the resulting elastomer has excellent elongation.

2) The sealing material after crosslinking has excellent gas barrier properties against a fuel gas and an oxidizing gas.

3) The sealing material after crosslinking has low moisture permeability.

4) The amount of impurity ions eluted from the sealing material after crosslinking is markedly small.

5) The sealing material after crosslinking has excellent resistance against methanol.

6) The sealing material after crosslinking has excellent adhesion even with a fluorine resin-containing ion exchange resin membrane.

In Example 2, a unit cell (20) was formed in the same manner as in Example 1, except that a heat curing sealing material ("Three Bond 11X-066", trade name; product of Three Bond Co., Ltd.) in which the backbone of each of the addition polymerizable oligomer and curing agent is an isobutylene structure was used instead of the sealing material 11X-058.

The sealing material "11X-066" employed herein is a liquid resin composition which has features that it comprises A) an addition-polymerizable oligomer which has, in its molecule thereof, at least two alkenyl groups, has a polyisobutylene structure in its backbone and has a viscosity at 25° C. of 25 to 100,000 $mm^2$/s; B) a hardener which contains, in its molecule thereof, at least two hydrogen atoms each bonded to a silicon atom, has a polyisobutylene structure in its backbone, and a viscosity at 25° C. of 10 to 10,000 $mm^2$/s; and C) a catalytic amount of a platinum compound, and that the hardener B) is incorporated so that the amount of the hydrosilyl group ranges from 0.5 to 5 moles per mole of the alkenyl group in the addition polymerizable oligomer.

The sealing material employed in this Example has the following properties:

1) In a temperature range of from 70 to 100° C., the sealing material is crosslinked for from 20 to 60 minutes, and the resulting gel-like substance has excellent elongation.

2) The sealing material after crosslinking has excellent gas barrier properties against a fuel gas and an oxidizing gas.

3) The sealing material after crosslinking has low moisture permeability.

4) The amount of impurity ions eluted from the sealing material after crosslinking is markedly small.

5) The sealing material has low viscosity so that application operation can be carried out easily.

6) The sealing material after crosslinking has excellent adhesion with an ion exchange resin membrane.

For comparison, a unit cell was formed using each of two conventional sealing materials. One of the unit cells (20) was formed by using RTV Silicone ("Three Bond 1220D", trade name; product of Three Bond Co., Ltd.) instead of the sealing material (26) of the present invention under the curing conditions of 25° C. and 55% RH for 7 days. The other one was formed by using one-liquid type heat-curing epoxy resin ("Three Bond 2282", trade name; product of Three Bond Co., Ltd.) under the curing conditions of 100° C. for 60 minutes.

In each of the unit cells obtained in Examples 1 and 2 by using the sealing material of the present invention, air tightness against the fuel gas and oxidizing gas and moist condition in each of the unit cells were maintained. In the unit cell obtained in the Comparative Example using the RTV silicone, however, the wet state in the unit cell was not maintained. In the unit cell obtained in the other Comparative Example using the heat curing epoxy resin, the sealing and wet state were maintained but discoloration of the ion exchange resin membrane (21) due to elution of impurity ion was observed.

Upon deassembly of the unit cell (20) after completion of the operation, cohesive failure occurred in the cells obtained using 11X-058 in Example 1 and using 11X-066 in Example 2, which showed good adhesion to the ion exchange resin membrane. In the respective cells using RTV silicone and one-liquid type heat curing epoxy resin obtained in the Comparative Examples, on the other hand, interfacial peeling occurred.

In the above-described Examples 1 and 2, the ion exchange resin membrane had a thickness of 100 μm. It is generally considered that the thinner the ion exchange resin membrane, the better the electrical conductivity, thus contributing to an improvement in the performance of a unit cell. In view of this, with an ion exchange resin membrane having a thickness of 50 μm, cells were produced using each of the above-described sealing material 11X-057 and 11X-066, and the same tests as made in Examples 1 and 2 were carried out. As a result, the resulting cells were confirmed to exhibit similar effects.

Ion exchange resin membranes tend to be damaged when it is subjected to thermocompression bonding. Since the damaged membrane may be short-circuited during the operation of a fuel cell, not an ion exchange resin membrane of 100 μm thick but that of 300 μm thick has so far been employed.

In the present invention, an elastic sealing material layer is formed between the ion exchange resin membrane (21) and separators (24) and (25) by the sealing material. Therefore, the ion exchange resin membrane (21) is not damaged during thermocompression bonding or operation of the fuel cell, whereby short circuiting is prevented.

INDUSTRIAL APPLICABILITY

As described above, the fuel cell using the sealing material according to the present invention does not require pretreatment for an ion exchange resin membrane upon bonding of the ion exchange resin membrane with separators, can maintain the wet state upon operation and permits airtight sealing with separating a fuel gas from an oxidizing gas. Accordingly, when use of the fuel cell for an automobile is considered, it can exhibit good sealing performance against various movements such as vibration. In addition, since disposition of an O-ring having a predetermined thickness of about 2 mm is not necessary, the thickness of the whole fuel cell can be reduced, making it possible to enhance the capacity of the cell by an increase in the number of the cells to be stacked. Moreover, automatic application of the adhesive employed in the present invention by machine is possible, which brings about shortening of the work, efficiency increase and cost reduction.

The sealing material according to the present invention can be adhered and sealed without contaminating an ion exchange resin membrane, which is a solid electrolyte, with ions. This makes the use of an O-ring unnecessary, thereby enabling size reduction or thickness reduction of the fuel cell. In addition, owing to its gas impermeability, the sealing material is excellent in the airtight sealing of gas between the ion exchange resin membrane and separators and can maintain the wet state of the electrolyte membrane.

As a result, the fuel cell having an ion exchange resin membrane, separators and a pair of electrodes adhered and airtightly sealed by the sealing material of the present invention is thin and small in size and has high electromotive power. At the same time, it has resistance against vibrations so that it is suitable for use as a fuel cell for an automobile.

What is claimed is:

1. A method of sealing unit cell members of a fuel cell, which comprises the steps of:
    applying a sealing material composition to surfaces of unit cell members to be bonded; and
    allowing the applied sealing material composition to three-dimensionally crosslink through addition polymerization to form an elastic sealing layer,
    wherein said sealing material composition comprises:
        A) an addition-polymerizable oligomer which has, as a backbone thereof, a linear polyisobutylene or perfluoropolyether structure and has an alkenyl group at least at each end thereof;
        B) a hardner containing, in its molecule thereof, at least two hydrogen atoms each bonded to a silicon atom; and
        C) a hydrosilylation catalyst.

2. The sealing method according to claim 1, wherein said unit cell members include separators, a pair of electrodes, and an ion exchange resin membrane.

3. The sealing method according to claim 1, wherein said addition-polymerizable oligomer A) has a polyisobutylene structure as the backbone thereof, and said hardener B) has a polyisobutylene structure as a backbone thereof.

4. The sealing method according to claim 1, wherein said addition-polymerizable oligomer A) has a perfluoropolyether structure as a backbone thereof, and said hardner B) has a perfluoropolyether structure as a backbone thereof.

5. A fuel cell which comprises a unit cell comprising unit cell members and an elastic sealing layer which seals said unit cell members,
    wherein said elastic sealing layer is formed by a method comprising the steps of:
        applying a sealing material composition to surfaces of unit cell members to be bonded; and
        allowing the applied sealing material composition to three-dimensionally crosslink through addition polymerization,
    wherein said sealing material composition comprises:
        A) an addition-polymerizable oligomer which has, as a backbone thereof, a linear polyisobutylene or perfluoropolyether structure and has an alkenyl group at least at each end thereof;
        B) a hardner containing, in its molecule thereof, at least two hydrogen atoms each bonded to a silicon atom; and
        C) a hydrosilylation catalyst.

6. The fuel cell according to claim 5, wherein said unit cell members include separators, a pair of electrodes, and an ion exchange resin membrane.

7. The fuel cell according to claim 5, where in said addition-polymerizable oligomer A) has a polyisobutylene structure as a backbone thereof, and said hardner B) has a polyisobutylene structure as a backbone thereof.

8. The fuel cell according to claim 5, wherein said addition-polymerizable oligomer A) has a perfluoropolyether structure as the backbone thereof, and said hardner B) has a perfluoropolyether structure as a backbone thereof.

* * * * *